(12) United States Patent
Bao (10) Patent No.: US 7,280,961 B1
(45) Date of Patent: Oct. 9, 2007

(54) PATTERN RECOGNIZING DEVICE AND METHOD, AND PROVIDING MEDIUM

(75) Inventor: Hongchang Bao, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/674,583

(22) PCT Filed: Mar. 3, 2000

(86) PCT No.: PCT/JP00/01282

§ 371 (c)(1),
(2), (4) Date: Feb. 5, 2001

(87) PCT Pub. No.: WO00/52682

PCT Pub. Date: Sep. 8, 2000

(30) Foreign Application Priority Data

Mar. 4, 1999 (JP) ................................. 11-057467

(51) Int. Cl.
*G10L 21/02* (2006.01)
(52) U.S. Cl. ...................................... 704/233; 704/226
(58) Field of Classification Search ................ 704/233, 704/256, 226–228
See application file for complete search history.

(56) References Cited

U.S. PATENT DOCUMENTS

| | | | | | |
|---|---|---|---|---|---|
| 4,628,529 | A | * | 12/1986 | Borth et al. ................ | 381/94.3 |
| 4,630,304 | A | * | 12/1986 | Borth et al. ................ | 381/94.3 |
| 4,811,404 | A | * | 3/1989 | Vilmur et al. ............. | 381/94.3 |
| 5,148,489 | A | * | 9/1992 | Erell et al. .................... | 704/226 |
| 5,353,376 | A | * | 10/1994 | Oh et al. ..................... | 704/233 |
| 5,651,094 | A | * | 7/1997 | Takagi et al. ................ | 704/244 |
| 5,706,394 | A | * | 1/1998 | Wynn ......................... | 704/219 |
| 5,778,342 | A | * | 7/1998 | Erell et al. ................... | 704/256 |
| 5,806,034 | A | * | 9/1998 | Naylor et al. ................ | 704/256 |
| 5,839,103 | A | * | 11/1998 | Mammone et al. ......... | 704/232 |
| 5,924,065 | A | * | 7/1999 | Eberman et al. ............ | 704/231 |
| 6,023,676 | A | * | 2/2000 | Erell ........................... | 704/241 |
| 6,067,517 | A | * | 5/2000 | Bahl et al. ................... | 704/256 |
| 6,188,982 | B1 | * | 2/2001 | Chiang ........................ | 704/256 |
| 6,230,128 | B1 | * | 5/2001 | Smyth ......................... | 704/236 |
| 6,381,571 | B1 | * | 4/2002 | Gong et al. ................. | 704/233 |
| 6,418,411 | B1 | * | 7/2002 | Gong .......................... | 704/256 |
| 6,591,237 | B2 | * | 7/2003 | Erell ........................... | 704/251 |

(Continued)

FOREIGN PATENT DOCUMENTS

EP 0 913 810 A2 5/1999

(Continued)

OTHER PUBLICATIONS

ReliaSoft Corp., "MLE (Maximum Likelihood) Parameter Estimation Tutorial", 2002, http://www.weibull.com/AccelTestWeb/mle_maximum_likelihood_parameter_estimation.htm.*

(Continued)

*Primary Examiner*—Michael N Opsasnick
(74) *Attorney, Agent, or Firm*—Frommer Lawrence & Haug LLP; William S. Frommer; Thomas F. Presson (57) ABSTRACT

The silence-acoustic-model correcting division generates a silence acoustic model that is used for recognizing the silent section Ts which exists in the beginning of the speech recognition section, on the basis of the environment noise that is included in the noise observation section Tn.

8 Claims, 8 Drawing Sheets

U.S. PATENT DOCUMENTS 6,839,670 B1 * 1/2005 Stammler et al. ............ 704/251
6,910,010 B2 * 6/2005 Iwahashi et al. ............ 704/233

FOREIGN PATENT DOCUMENTS

| JP | 56-159400 | 11/1981 |
| JP | 5-219176 | 8/1993 |
| JP | 5-316186 | 11/1993 |
| JP | 11-133992 | 5/1999 |

OTHER PUBLICATIONS

Proceedings of the 8th Sony Research Forum, Hongchang Pao et al., "Stochastic Feature Extraction for Improving Noise Robustness in Speech Recognition", pp. 9-14, 1999.

Proceedings of the IEEE 1998 International Conference on Acoustics, Speech and Signal Processing, vol. 2, N. Iwahashi et al., Stochastic Features for Noise Robust Speech Recognition, pp. 633-636, May 12-15, 1998, Seattle, Washington, USA.

N. Iwahashi et al., "Noise Robust Speech Recognition Using Stochastic Representation of Features", pp. 91-92, Mar. 17, 1998.

N. Iwahashi et al., Technical Report of IEICE, SP97-97, "Stochastic Representation of Features for Noise Robust Speech Recognition", pp. 17-22, Jan. 23, 1998.

* cited by examiner

PATTERN RECOGNIZING DEVICE AND METHOD, AND PROVIDING MEDIUM

TECHNICAL FIELD

The present invention is directed to a device and a method for pattern recognition, and to a providing medium. More particularly, the invention relates to a device and a method for pattern recognition for recognizing words that have been spoken under a noisy environment, and to a providing medium.

BACKGROUND ART

Heretofore, methods for discriminating words that are spoken under noisy environments have been devised; as the typical methods, PMC (Parallel Model Combination) method, SS/NS (Spectral Subtraction/Nonlinear Spectral Subtraction) method, SFE (Stochastic Feature Extraction) method and others are known.

In any of the above-mentioned methods, a feature quantity of a voice data of a spoken voice that exists together with an environment noise is extracted, and it is judged that which of the acoustic models that are corresponding to the previously registered plural words is the one to which the feature quantity is most matching, and then the word that corresponds to the most matched acoustic model is output as the result of the recognition.

The features of the above-mentioned methods are described below. That is, as to PMC method, the correct recognition rate is excellent because environment noise information is directly incorporated in an acoustic model, but the calculation cost becomes high (high-level computation is required, therefore, the scale of the device becomes large, and the time needed for the processing is longer). As to SS/NSS method, the environment noise is eliminated on a stage for extracting the feature quantity of the voice data. Hence, the calculation cost is lower than that of PMC method, and so, this method is used in many cases at present. In this connection, the feature quantity of the voice data is extracted as a vector, in SS/NSS method. As to SFE method, the environment noise is eliminated on the stage for extracting the feature quantity of the mixed signal, in the same way as SS/NSS method, however, the feature quantity is extracted as the probability distribution.

By the way, in SFE method, the environment noise is not directly reflected on the speech recognition stage, that is, the information of the environment noise is not directly incorporated in the silence acoustic model, and so, there has been such a problem that the correct recognition rate is insufficient.

In addition, because the information of the environment noise is not directly incorporated in the silence acoustic model, as the time from the time point at which the speech recognition has been started till the time point at which the speech is started becomes longer, the correct recognition rate lowers; that was also the problem.

DISCLOSURE OF THE INVENTION

Considering such circumstances, the present invention aims to correct the silence acoustic model by the use of the information of the environment noise, and to hereby prevent the correct recognition rate from lowering as the time from the time point at which the speech recognition has been started till the time point at which the speech is started becomes longer.

To solve such problems, the present invention provides a pattern recognizing device that comprises extracting means for extracting the pattern of the input data as the feature distribution, storing means for storing the stated number of models, classifying means for classifying the feature distribution that has been extracted by the extracting means into any of the stated number of models, and generating means for generating a model that corresponds to such a state that data do not exist, on the basis of the noise that has been input at the time just preceding the inputting of the data, and then updating that which is corresponding to it and stored in the storing means.

Besides, the present invention provides a pattern recognizing method that comprises an extracting step of extracting the pattern of the input data as the feature distribution, a storing step of storing the stated number of models, a classifying step of classifying the feature distribution that has been extracted at the extracting step into any of the stated number of models, and a generating step of generating a model that corresponds to such a state that data do not exist, on the basis of the noise that has been input at the time just preceding the inputting of the data, and then updating that which corresponds to it and has been stored at the storing step.

In addition, the present invention provides a providing medium for providing the program that can be read by a computer which causes the pattern recognizing device to execute the processing that includes an extracting step of extracting the pattern of the input data as the feature distribution, a storing step of storing the stated number of models, a classifying step of classifying the feature distribution that has been extracted at the extracting step into any of the stated number of models, and a generating step of generating a model that corresponds to such a state that data do not exist, on the basis of the noise that has been input at the time just preceding the inputting of the data, and then updating that which corresponds to it and has been stored at the storing step.

As a result of this, according to such a pattern recognizing device, a pattern recognizing method, and a providing medium, the pattern of the input data is extracted as the feature distribution, and the stated number of models are stored, and then the extracted feature distribution is classified into any of the stated number of models. Besides, a model that corresponds to such a state that any data do not exist is generated on the basis of the noise that has been input at the time just preceding the inputting of the data, and that which is corresponding to it and which has been being stored is updated. In this way, it becomes possible to prevent the correct recognition rate from lowering as the time from the time point at which the speech recognition has been started till the time point at which the speech is started becomes longer.

BEST MODE FOR CARRYING OUT THE INVENTION

An example of the configuration of the speech recognizing device to which the present invention has been applied will be explained, with reference to the FIG. 1. In this speech recognizing device, a microphone 1 gathers spoken voice that is the object of recognition together with the environment noise, and outputs it to a framing division 2. The framing division 2 takes the voice data, which is input from the microphone 1, with the stated time interval (for instance, 10 ms), and outputs the taken data as the data of 1 frame. The voice data of 1 frame unit, which is the output of the framing division 2, is supplied to a noise-observation-section extracting division 3 and a feature extracting division 5 as an observation vector a, the components of which are the respective time series of voice data that compose the very frame.

Hereinafter, an observation vector that is the t-th frame voice data is designated as a(t), for convenience.

Figure 2:
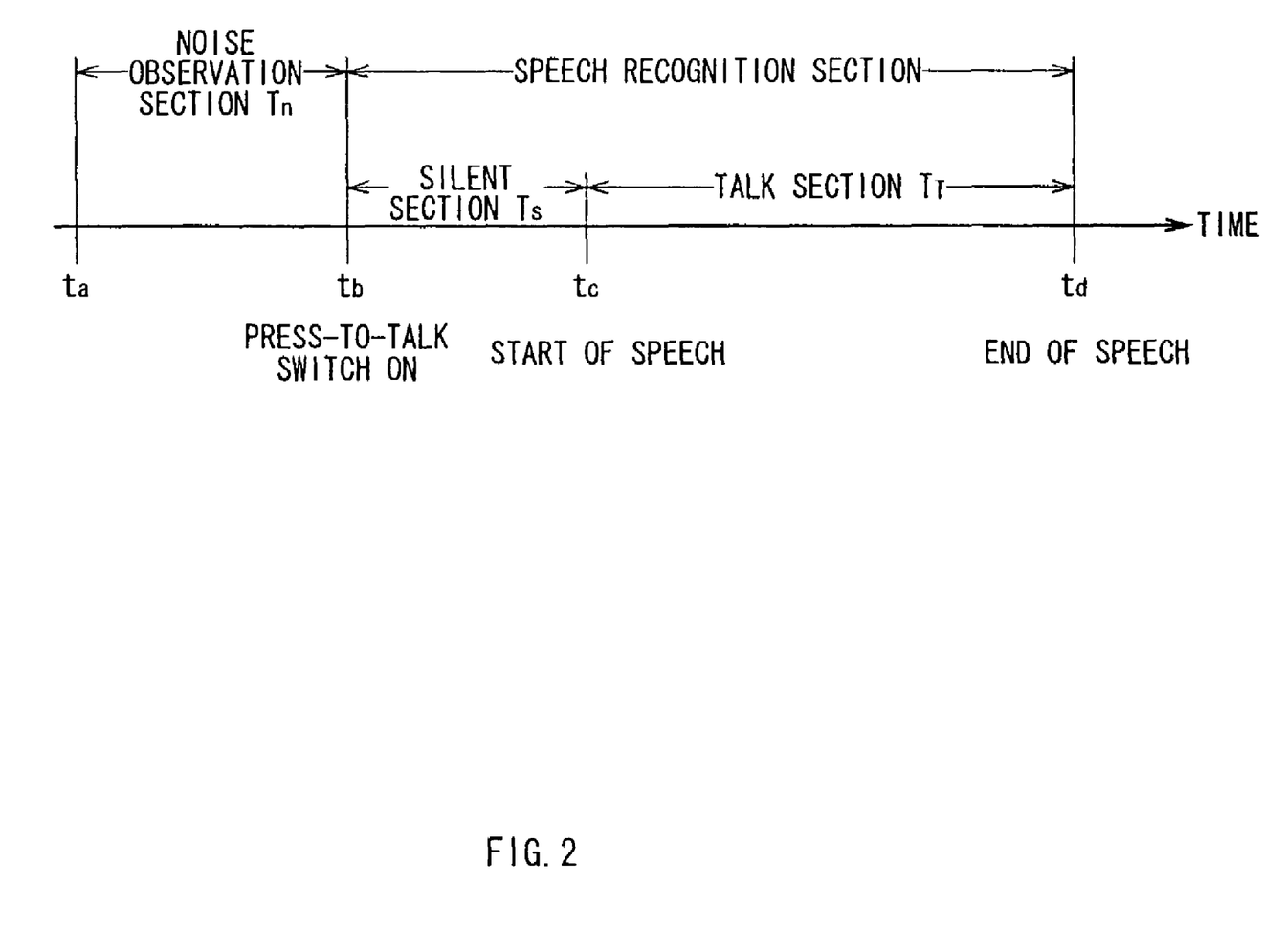
FIG. 2 is a diagram used for explaining the operation of the noise-observation-section extracting division of FIG. 1.

The noise-observation-section extracting division 3 performs buffering of the framed voice data that is input from the framing division 2, during only the stated time (a duration which corresponds to M frames or more); a section from the instant $t_b$ at which a press-to-talk switch 4 has been turned to the ON position until the instant $t_a$ which precedes the instant $t_b$ by M frames is referred to as the noise observation section Tn, as shown in FIG. 2; the noise-observation-section extracting division 3 extracts the observation vector a of M frames in the noise observation section Tn, and outputs it to the feature extracting division 5 and to a silence-acoustic-model correcting division 7.

The press-to-talk switch 4 is turned to its ON position by the user himself, at the time when he intends to start speaking. Therefore, the spoken voice is not included in the voice data of the noise observation section Tn, which precedes the instant $t_b$ at which the press-to-talk switch 4 has been turned to the ON position, and only the environment noise exists. Besides, a section from the instant $t_b$ at which the press-to-talk switch 4 has been turned to the ON position till the instant $t_d$ at which the press-to-talk switch 4 has been turned to the OFF position is referred to as a speech recognition section, and the voice data of the section is treated as the object of speech recognition.

On the basis of the voice data that is input from the noise-observation-section extracting division 3 and including only the environment noise of the noise observation section Tn, the feature extracting division 5 eliminates the environment noise components out of the observation vector a of the speech recognizing section succeeding the instant $t_b$ that is input from the framing division 2, and then extracts its feature quantity. In other words, the feature extracting division 5 performs, for instance, Fourier transformation with respect to true voice data (the environment noise has been eliminated) that is treated as the observation vector a, and obtains its power spectrum, and then calculates a feature vector y whose components are the respective frequency components of the power spectrum. In this connection, the power-spectrum calculating method is not limited to that which is based on Fourier transformation. That is, the power spectrum can be obtained by the other methods, such as so-called filter-bank method.

In addition, on the basis of the calculated feature vector y, the feature extracting division 5 calculates a parameter Z that represents the distribution on the feature vector space (hereinafter, this is referred to as a feature distribution parameter) that is obtained when the voice included in the voice data which is the observation vector a has been mapped to the space of the feature quantity (the feature quantity space), and then supplies the parameter Z to a speech recognizing division 6.

Figure 1:
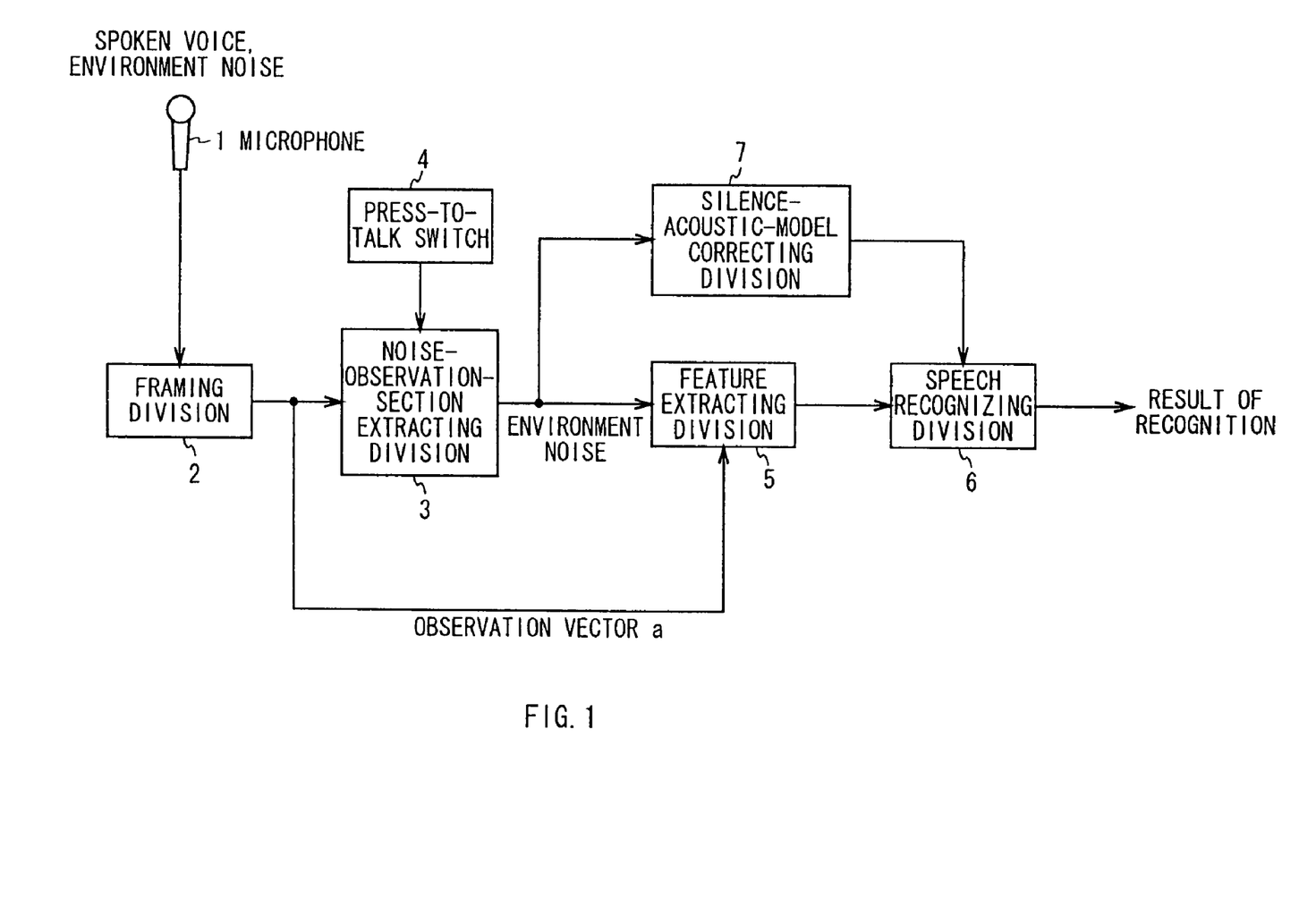
FIG. 1 is a block diagram showing an example of the configuration of a speech recognition device to which the present invention has been applied.
Figure 3:
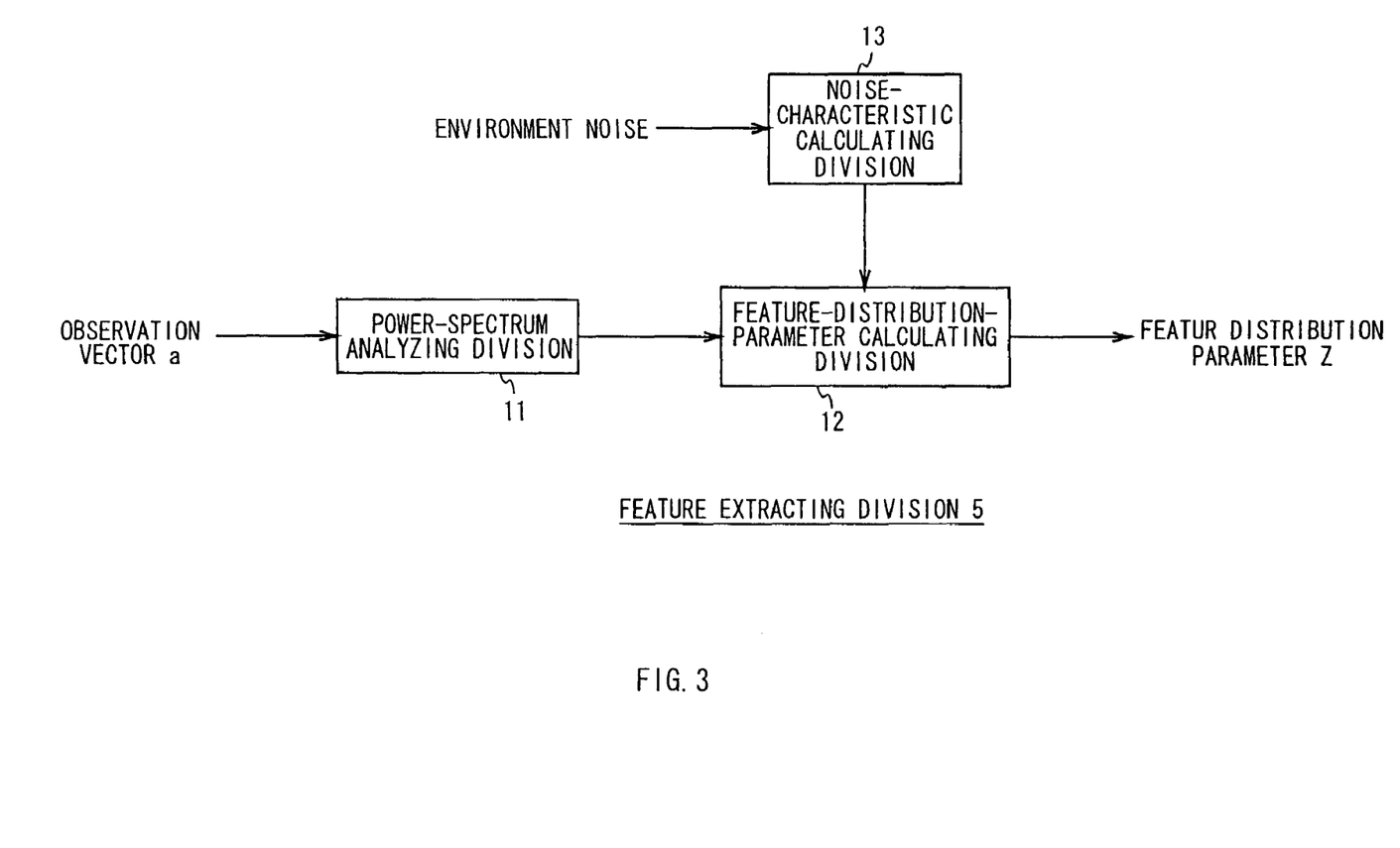
FIG. 3 is a block diagram showing an example of the detailed configuration of the feature extracting division of FIG. 1.

FIG. 3 is showing an example of the detailed configuration of the feature extracting division 5 of FIG. 1. The observation vector a, which is input from the framing division 2, is supplied to a power-spectrum analyzing division 11 in the feature extracting division 5. On the power-spectrum analyzing division 11, for instance, Fourier transformation is performed by FFT (fast Fourier transformation) algorithm, with respect to the observation vector a, in this way, the power spectrum that is the feature quantity of the speech is extracted as the feature vector. In this preferred embodiment, the observation vector a, which is the voice data of 1 frame, is translated into the feature vector that is comprised of D components (D-dimensional feature vector).

At here, the feature vector that is obtained from the observation vector a(t) of the t-th frame is designated as y(t). Besides, out of the feature vector y(t), the spectrum component of true speech is designated as x(t), and the spectrum component of environment noise is designated as u(t). In this case, the spectrum component of true speech x(t) is represented with the following equation, eq. 1.

$$x(t)=y(t)-u(t) \tag{1}$$

Wherein, it is assumed that the environment noise has an irregular characteristic, and the observation vector a(t) is such a voice data that the environment noise has been added to true speech component.

On the other hand, the voice data (environment noise), which is input from the noise-observation-section extracting division 3, is input to a noise-characteristic calculating division 13 in the feature detecting division 5. On the noise-characteristic calculating division 13, the characteristics of the environment noise in the noise observation section Tn is obtained.

That is, at here, mean value (mean vector) and variance (variance matrix) of the environment noise are obtained on the noise-characteristic calculating division 13, wherein it is assumed that the distribution of the power spectrum u(t) of the environment noise at the speech recognition section is identical to that of the environment noise at the noise observation section Tn which is just preceding the speech recognition section, and it is also assumed that the distribution is normal distribution.

The mean vector μ' and the variance matrix Σ' can be obtained on the basis of the following equations, eq. 2 and eq. 3.

$$\mu'(i) = \frac{1}{M}\sum_{t=1}^{M} y(t)(i) \tag{2}$$

$$\sum{}'(i,j) = \frac{1}{M}\sum_{t=1}^{M}(y(t)(i)-\mu'(i))(y(t)(j)-\mu'(j))$$

Where μ'(i) represents the i-th component of the mean vector λ' (i=1, 2, . . . , D). Besides, y(t)(i) represents the i-th component of the t-th frame's feature vector. In addition, Σ'(i, j) represents the i-th row and the j-th column component of the variance matrix Σ', (j=1, 2, . . . , D).

At here, in order to reduce the quantity of calculation, it is assumed that the respective components of the feature vector y are uncorrelated to each other, with respect to the environment noise. In this case, as shown in the following equation, the variance matrix Σ' other than the diagonal elements become 0.

$$\Sigma'(i,j)=0, i \neq j \tag{3}$$

In this way, the mean vector μ' and the mean value Σ', which are the characteristics of the environment noise, are obtained on the noise-characteristic calculating division 13, and then supplied to a feature-distribution-parameter calculating division 12.

On the other hand, the output of the power-spectrum analyzing division 11, that is the feature vector y of the spoken voice that includes the environment noise, is supplied to the feature-distribution-parameter calculating division 12. On the feature-distribution-parameter calculating division 12, the feature distribution parameter that represents the distribution of the power spectrum of true speech (the distribution of the estimated value) is calculated, on the basis of the feature vector y that is given from the power-spectrum analyzing division 11 and the characteristics of the environment noise that is given from the noise-characteristic calculating division 13.

That is, on the feature-distribution-parameter calculating division 12, based on the presumption that the distribution of the power spectrum of true speech is normal distribution, the mean vector ξ and the distribution matrix ψ of that are calculated as the feature distribution parameter, in accordance with the following equations, eq. 4 through eq. 7.

$$\xi(t)(i) = E[x(t)(i)] \quad (4)$$
$$= E[y(t)(i) - u(t)(i)]$$
$$= \int_0^{y(t)(i)} (y(t)(i) - u(t)(i)) \frac{P(u(t)(i))}{\int_0^{y(t)(i)} P(u(t)(i)) du(t)(i)} du(t)(i)$$
$$= \frac{y(t)(i) \int_0^{y(t)(i)} P(u(t)(i)) du(t)(i) - \int_0^{y(t)(i)} u(t)(i) P(u(t)(i)) du(t)(i)}{\int_0^{y(t)(i)} P(u(t)(i)) du(t)(i)}$$
$$= y(t)(i) - \frac{\int_0^{y(t)(i)} P(u(t)(i)) du(t)(i)}{\int_0^{y(t)(i)} P(u(t)(i)) du(t)(i)}$$

$$\text{If } i = j, \text{ then } \Psi(t)(i, j) = V[x(t)(i)] \quad (5)$$
$$= E[(x(t)(i))^2] - (E[x(t)(i)])^2$$
$$( = E[(x(t)(i))^2] - (\xi(t)(i))^2)$$
$$\text{If } i \neq j, \text{ then } \Psi(t)(i, j) = 0$$

$$E[(x(t)(i))^2] = E[(y(t)(i) - u(t)(i))^2] \quad (6)$$
$$= \int_0^{y(t)(i)} (y(t)(i) - u(t)(i))^2 \frac{P(u(t)(i))}{\int_0^{y(t)(i)} P(u(t)(i)) du(t)(i)} du(t)(i)$$
$$= \frac{1}{\int_0^{y(t)(i)} P(u(t)(i)) du(t)(i)} \times \Big\{ (y(t)(i))^2 \int_0^{y(t)(i)} P(u(t)(i)) du(t)(i) -$$
$$2y(t)(i) \int_0^{y(y)(i)} u(t)(i) P(u(t)(i)) du(t)(i) + \int_0^{y(t)(i)} (u(t)(i))^2 P(u(t)(i)) du(t)(i) \Big\}$$
$$= (y(t)(i))^2 - 2y(t)(i) \frac{\int_0^{y(t)(i)} u(t)(i) P(u(t)(i)) du(t)(i)}{\int_0^{y(t)(i)} P(u(t)(i)) du(t)(i)} +$$
$$\frac{\int_0^{y(t)(i)} (u(t)(i))^2 P(u(t)(i)) du(t)(i)}{\int_0^{y(t)(i)} P(u(t)(i)) du(t)(i)}$$

$$P(u(t)(i)) = \frac{1}{\sqrt{2\pi \Sigma'(i, i)}} e^{-\frac{2}{2\Sigma'(i,i)}(u(t)(i) - u'(i))^2} \quad (7)$$

Where ξ(t)(i) represents the i-th component of the mean vector ξ(t) in the t-th frame. E[ ] designates the mean value of what is within the bracket [ ]. And, x(t)(i) represents the i-th component of the power spectrum of true speech in the t-th frame x(t). In addition, u(t)(i) represents the i-th component of the power spectrum of the environment noise in the t-th frame, and P(u(t)(i)) represents such a probability that the i-th component of the power spectrum of the environment noise in the t-th frame is u(t)(i). It is assumed herein that the distribution of the environment noise is normal distribution, and so P(u(t)(i)) is represented as shown in eq. 7.

And, ψ(t)(i,j) represents the i-th row and the j-th column component of the variance ψ(t) in the t-th frame. In addition, V[ ] represents the variance of what is within the bracket [ ]. On the feature-distribution-parameter calculating division 12, the mean vector ξ and the variance matrix ψ are thus obtained, for each frame, as the feature distribution parameter that represents the distribution upon the feature vector space of true speech (this means the distribution of the case where it has been assumed that the distribution upon the feature vector space of true speech is normal distribution).

After that, the feature distribution parameter that has been obtained in each frame of the speech recognition section is output to the speech recognizing division 6. Now, supposing that the speech recognition section is comprised of T frames, and the feature distribution parameters that have been obtained in the respective T frames are designated as z(t)= {ξ(t), ψ(t)} (t=1, 2, . . . , T), the feature-distribution-parameter calculating division 12 supplies the feature distribution parameter (sequence) Z={z(1), z(2), . . . , z(T)} to the speech recognizing division 6.

Referring to FIG. 1 again, the speech recognizing division 6 classifies the feature distribution parameter Z, which is input from the feature extracting division 5, into any of the stated number K of acoustic models and one silence acoustic model, and then outputs the result of the classification as the result of the recognition of the input voice. In other words, the speech recognizing division 6 stores, for instance, a discriminant function that is corresponding to the silent section (a function for discriminating whether the feature parameter Z should be classified into the silence acoustic model or not) and discriminant functions that are corresponding to the stated number K of words respectively (functions for determining that the feature parameter Z should be classified into any of acoustic models), and calculates the values of the discriminant functions of the respective acoustic models, using the feature distribution parameter Z given from the feature extracting division 5 as the argument. And, an acoustic model (a word or the silent section) that has the maximum function value is output as the result of the recognition.

Figure 4:
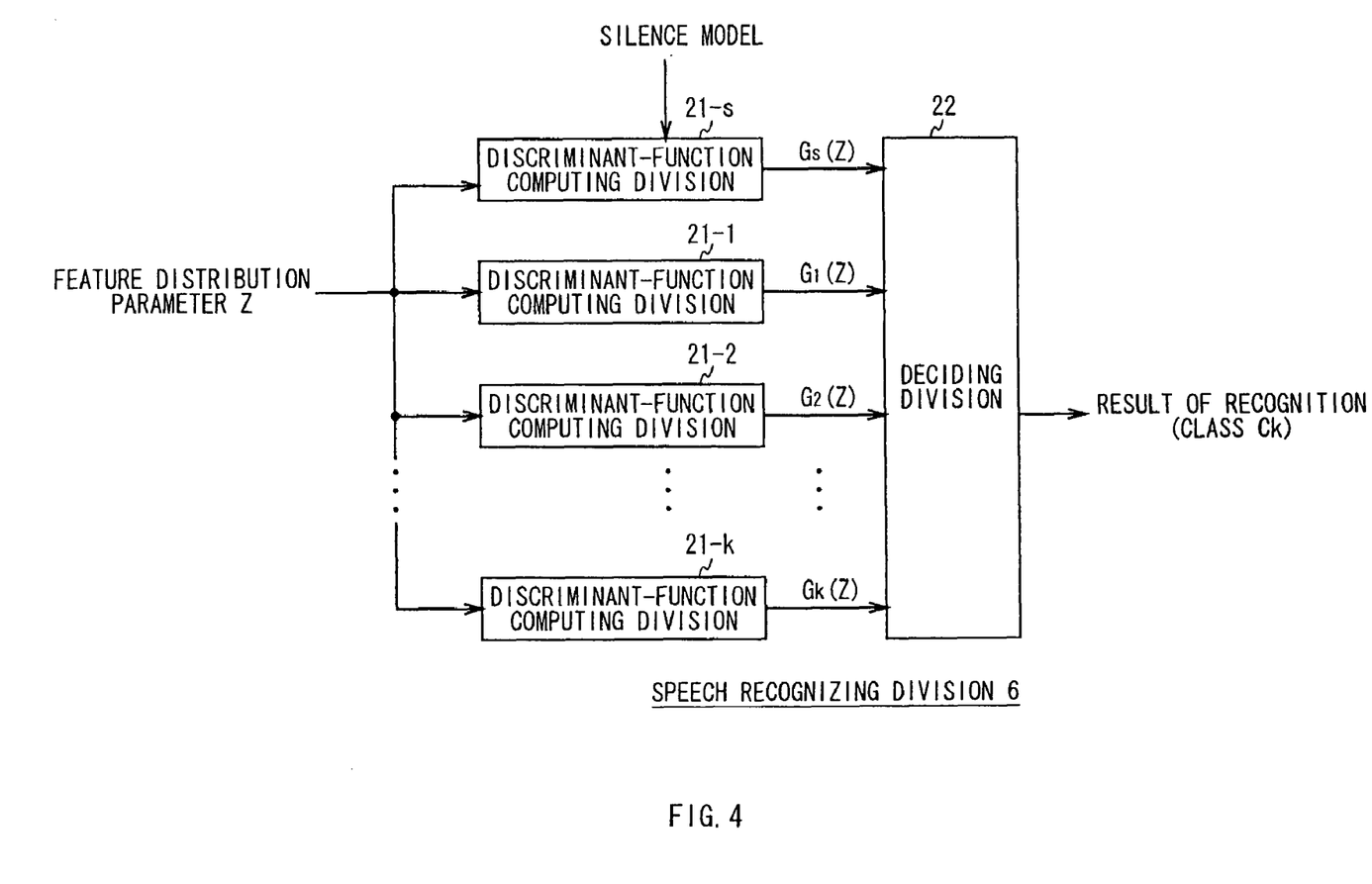
FIG. 4 is a block diagram showing an example of the detailed configuration of the speech recognizing division of FIG. 1.

FIG. 4 shows an example of the detailed configuration of the speech recognizing division 6 of FIG. 1. The feature distribution parameter Z, which is input from the feature-distribution-parameter calculating division 12 of the feature extracting division 5, is supplied to discriminant-function computing divisions 21-1 through 21-k, and to a discriminant-function computing division 21-s. The discriminant-function computing division 21-k (k=1, 2, . . . , K) is storing a discriminant function Gk (Z) for discriminating a word that is corresponding to the k-th one of K acoustic models, and computes the discriminant function Gk (Z), using the feature distribution parameter Z given from the feature extracting division 5 as the argument. The discriminant-function computing division 21-s is storing a discriminant function Gs (Z) for discriminating the silent section that is corresponding to the silent acoustic model, and computes the discriminant function Gs (Z), using the feature distribution parameter Z which is given from the feature extracting division 5 as the argument.

In this connection, on the speech recognizing division 6, discrimination (recognition) of the words or the silent section, which are the classes, is performed by the use of HMM (Hidden Markov) method, for instance.

Now, HMM method is explained with reference to FIG. 5. As shown in the figure, HMM has H states $q_1$ through $q_H$; as to transition of a state, only transition to itself and transition to the next state on the right side are allowed. The initial state is defined as the leftmost state $q_1$, and the final state is defined as the rightmost state $q_H$, and state transition that occurs from the final state $q_H$ is inhibited. A model that do not include any transition to the left side is referred to as a left-to-right model; in speech recognition, a left-to-right model is used in general.

Now, the model for discriminating k classes of HMM is referred to as the k classes model, hereinafter; the k classes model is prescribed by, for instance, a probability of staying in the state $q_h$ initially (the initial state probability) $\pi_k(q_h)$, a probability of staying in the state $q_i$ at a certain time (frame) t and transferring to the state $q_j$ at the next time t1 (the transition probability $a_k$ ($q_i$, $q_j$), and such a probability that the state $q_i$ outputs the feature vector O at the time when state transition occurs from the state $q_i$ (the output probability) $b_k(q_i)(O)$ (h=1, 2, . . . , H).

And, in the case where a certain feature vector sequence $O_1, O_2, \ldots$ has been given, for instance, the class of a model that has the highest probability of observation of such feature vector sequence (observation probability) is determined to be the result of the recognition of the feature vector sequence.

At here, this observation probability is obtained by the discriminant function $G_k(Z)$. That is, the discriminant function $G_k(Z)$ is given with the following equation, eq. 8, in the optimal state sequence (a way for transferring of the optimal state) relative to the feature distribution parameter (sequence) $Z=\{z_1, z_2, \ldots, z_T\}$, as what serves for obtaining such a probability that such feature distribution parameter (sequence) $Z=\{z_1, z_2, \ldots, z_T\}$ is observed.

$$g_k(Z) = \max_{q_1, q_2, \ldots, q_T} \pi_k(q_1) \cdot b'_k(q_1)(z_1) \cdot a_k(q_1, q_2) \cdot b'_k(q_2)(z_2) \ldots \quad (8)$$
$$a_k(q_{T-1}, q_T) \cdot b'_k(q_T)(z_T)$$

Where $b_k'(q_i)(Z_j)$ represents the output probability of the time when the output is the distribution that is represented with $z_j$. To the output probability $b_k(s)(O_t)$ that is a probability of outputting each feature vector at the time of state transition, at here, a normal distribution function is applied, as that which is uncorrelated to the component upon the feature vector space. In this case, when the input is a distribution that is represented by $Z_t$, the output probability $b_k'(s)(z_t)$ can be found with the following equation, eq. 9, using a probability density function $P_k^m(s)(x)$ that is prescribed by the mean vector μk(s) and the variance matrix $\Sigma_k(s)$, as well as a probability density function $P^f(t)(x)$ that represents the distribution of the t-th frame's feature vector (as used herein, the power spectrum) x.

$$b'_k(s)(z_t) = \int P^f(t)(x) P_k^m(s)(x) dx \quad (9)$$
$$= \prod_{i=1}^{D} P(s)(i)(\xi(t)(i), \psi(t)(i, i))$$
$$k = 1, 2, \ldots, K : s = q_1, q_2 \ldots, q_T : T = 1, 2 \ldots, T$$

Where the interval of integration of the integration operation in the equation 9 is the whole of D-dimensional feature vector space (as used herein, the power spectrum space).

Besides, in the equation 9, $P(s)(i)(\xi(t)(i), \psi(t)(i,i))$ is represented with the following equation, eq. 10.

$$P(s)(i)(\xi(t)(i), \psi(t)(i, i)) = \quad (10)$$
$$\frac{1}{\sqrt{2\pi\left(\sum_k (s)(i, i) + \psi(t)(i, i)\right)}} e^{-\frac{(\mu_k(s)(i) - \xi(t)(i))^2}{2(\Sigma_k(s)(i,i) + \psi(t)(i,i))}}$$

Where $\mu_k(s)(i)$ represents the i-th component of the mean vector $\mu_k(s)$, and $\Sigma_k(s)(i, i)$ represents the i-th row and i-th column component of the variance matrix $\Sigma_k(s)$, respectively. And, the output probability of the k classes model is prescribed by these.

As stated above, HMM is prescribed by the initial state probability $\pi_k(q_h)$, the transition probability $a_k(q_i, q_j)$, and the output probability $b_k(q_i)(O)$, which should be previously obtained by the use of the feature vector that is calculated from the learning voice data.

Figure 5:
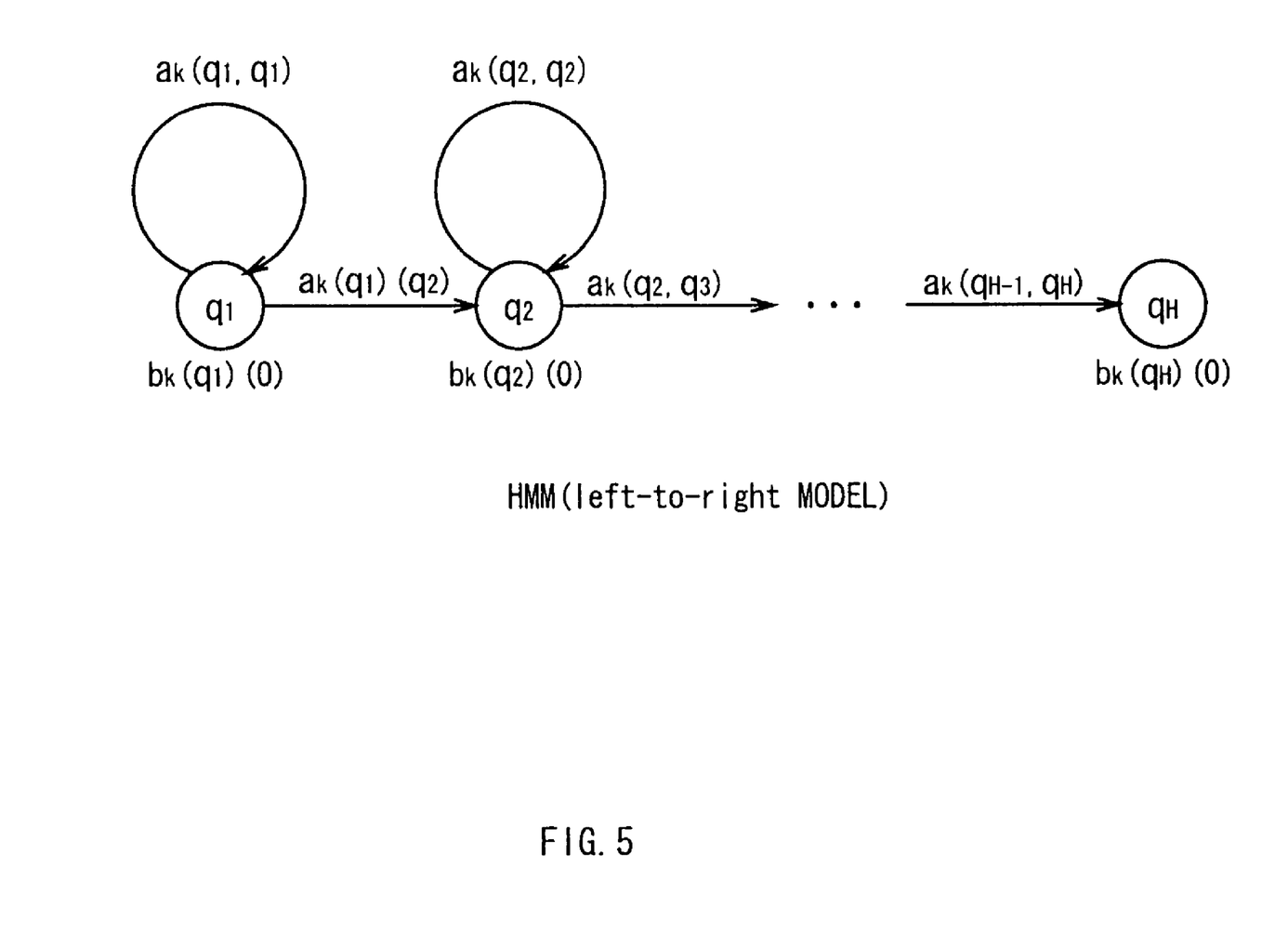
FIG. 5 is a diagram used for explaining the operation of the speech recognizing division.
Figure 6:
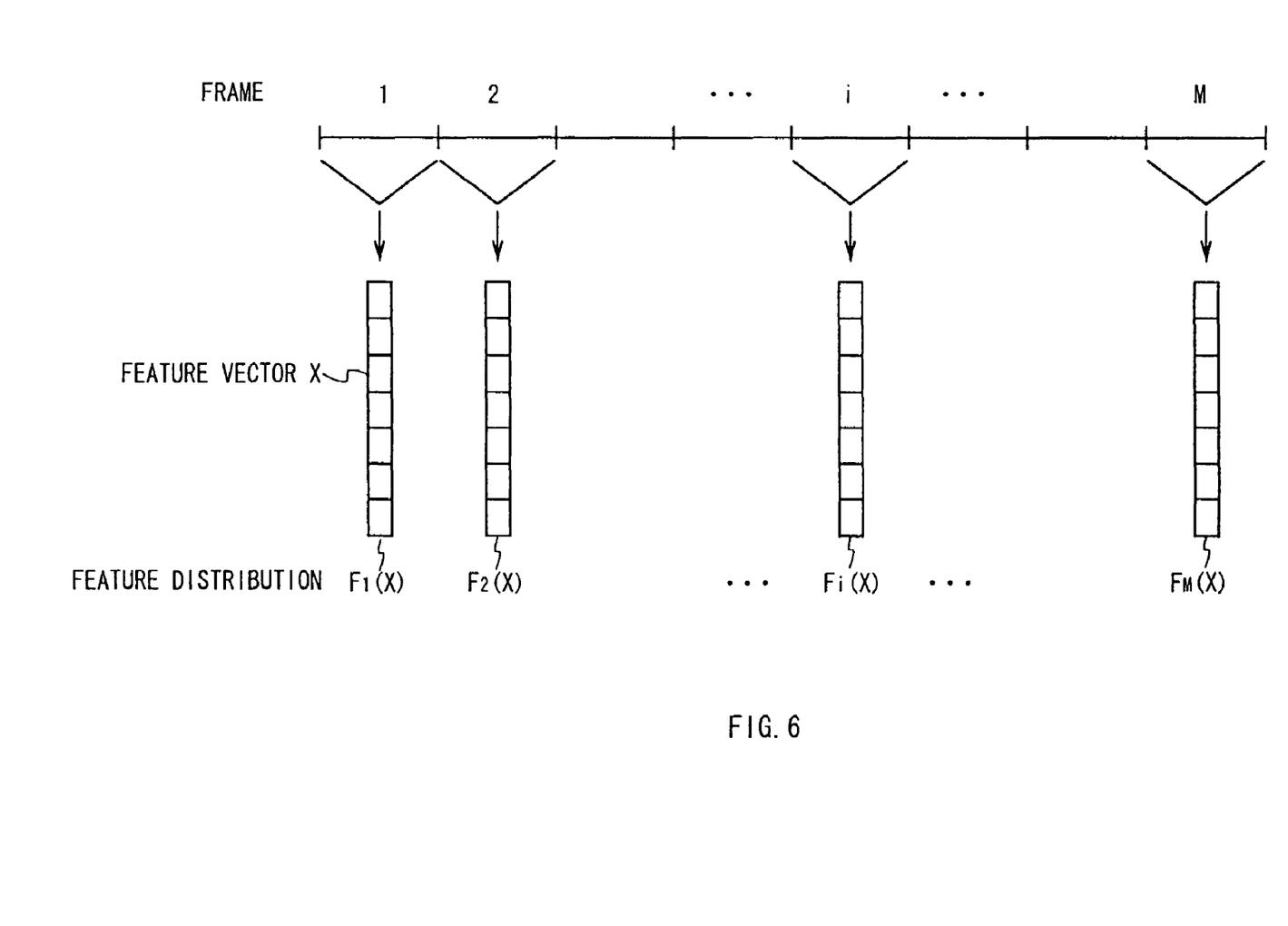
FIG. 6 is a diagram used for explaining the operation of the silence-acoustic-model correcting division of FIG. 1.

At here, in the case where that which has been shown in FIG. 5 is used as HMM, transition always starts at the leftmost state $q_1$, therefore, only the initial state probability that is corresponding to the state $q_1$ becomes 1, and all of the initial state probabilities that are corresponding to the other states become 0. On the presumption that $\omega(t)(i, i)$ is 0, the output probability coincides with the output probability in continuous HMM of the case where the variance of the feature vector is not regarded, as will be seen from the equations 9 and 10.

In this connection, as learning methods of HMM, Baum-Welch's re-estimation method and others are known.

Well, returns to FIG. 4. With respect to the k classes model, the discriminant-function computing divisions 21-$k$ (k=1, 2, ..., K) stores the discriminant function $G_k(Z)$ of the equation 8 that is prescribed by the initial state probability $\pi_k(q_h)$, the transition probability $a_k(q_i, q_j)$, and the output probability $b_k(q_i)(O)$, which have been previously obtained through learning, and calculates the discriminant function $G_k(Z)$, using the feature distribution parameter Z given from the feature extracting division 2 as the argument, and then outputs the resulted function value (the above-mentioned observation probability) $G_k(Z)$ to a deciding division 22. The discriminant-function computing division 21-$s$ stores the discriminant function $G_s(Z)$, which is similar to the discriminant function $G_k(Z)$ of the equation 8, that is prescribed by the initial state probability $\pi_s(q_h)$, the transition probability $a_s(q_i, q_j)$, and the output probability $b_s(q_i)(O)$, and calculates the discriminant function $G_s(Z)$, using the feature distribution parameter Z given from the feature extracting division 2 as the argument, and then outputs the resulted function value (the above-mentioned observation probability) $G_s(Z)$ to the deciding division 22.

In the deciding division 22, with respect to the function values $G_k(Z)$ (including the function value $G_s(Z)$, at this position) that are given from the respective ones of the discriminant-function computing divisions 21-1 through 21-$k$ and the discriminant-function computing division 21-$s$, the feature distribution parameter Z, that is, the class (the acoustic model) to which the input voice belongs is discriminated, by the use of, for instance, the decision rule shown in the following equation, eq. 11.

$$C(Z) = C_k, \quad \text{if } G_k(Z) = \max_i \{G_i(Z)\} \tag{11}$$

Where C(Z) represents the function for performing the discrimination operation (processing) of discriminating the class to which the feature distribution parameter Z belongs. Besides, Max in the right side member of the second expression of the equation 11 denotes the maximum value of the succeeding function value $G_i(Z)$, (as used at this position, i=s, 1, 2, ..., K).

The deciding division 22 decides the class in accordance with the equation 11, and then outputs it as the recognition result of the input voice.

Well, returns to FIG. 1 for reference. On the basis of the voice data (environment noise) of the noise observation section Tn, which is input from the noise-observation-section extracting division 3, the silence-acoustic-model correcting division 7 generates the discriminant function $G_s(Z)$ that is corresponding to the silence acoustic model stored in the speech recognizing division 6, and then supplies it to the speech recognizing division 6.

To put it concretely, in the silence-acoustic-model correcting division 7, the feature vector X is observed with respect to the respective frames of M frames of the voice data (environment noise) of the noise observation section Tn, which is input from the noise-observation-section extracting division 3, and the feature distribution of those is generated.

$$\{F_1(X), F_2(X), \ldots, F_M(X)\} \tag{12}$$

In this connection, the feature distribution $\{F_i(X), i=1, 2, \ldots, M\}$ is a probabilistic density function, and so, hereinafter, it is referred to as the silence feature distribution PDF, too.

Figure 7:
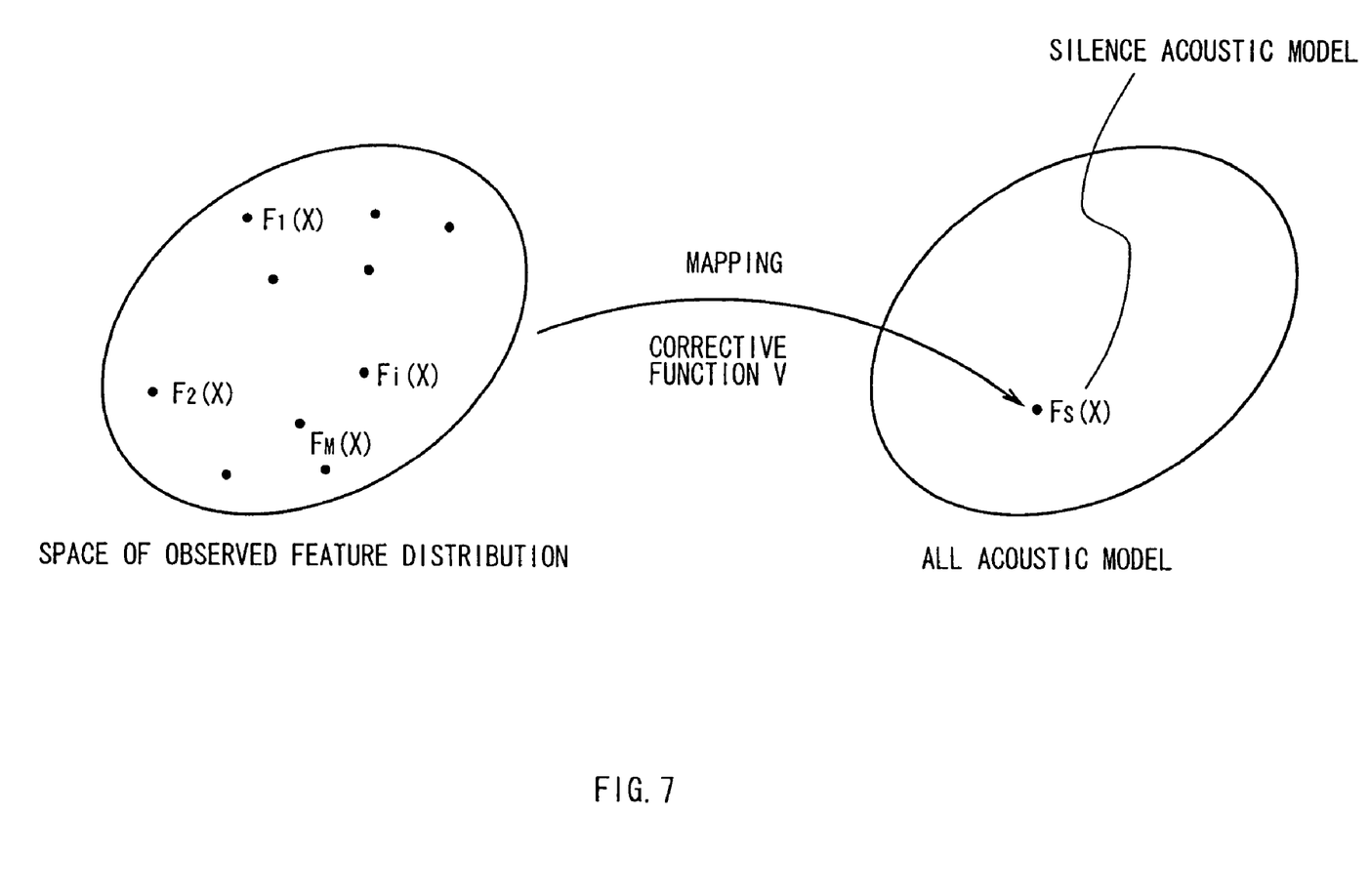
FIG. 7 is a diagram used for explaining the operation of the silence-acoustic-model correcting division of FIG. 1.

Next, as shown in FIG. 7, the silence feature distribution PDF is mapped to the probability distribution that is corresponding to the silence acoustic model $F_s(X)$, in accordance with the following equation, eq. 13.

$$F_s(X) = V(F_1(X), F_2(X), \ldots, F_M(X)) \tag{13}$$

Where V is a correcting function (mapping function) for mapping the silence feature distribution PDF$\{F_i(X), i=1, 2, \ldots, M\}$ to the silence acoustic model $F_s(X)$.

As to this mapping, according to the description of the silence feature distribution PDF, wide variety of methods are possible, for instance, $$F_s(X) = \sum_{i=1}^{M} \beta_i(F_1(X), F_2(X), \ldots, F_M(X), M) \cdot F_i(X) \tag{14}$$

$$= \sum_{i=1}^{M} \beta_i \cdot F_i(X). \tag{15}$$

Where $\beta_i(F_1(X), F_2(X), \ldots, F_M(X), M)$ is a weight function of each silence feature distribution $\beta_i$, and designated as $\beta_i$, hereinafter. Besides, the weight function $\beta_i$ should be that which satisfies the condition of the following equation, eq. 16.

$$\sum_{i=1}^{M} \beta_i(F_1(X), F_2(X), \ldots, F_M(X), M) = \sum_{i=1}^{M} \beta_i = 1 \tag{16}$$

Assuming that the probability distribution of the silence acoustic model $F_s(X)$ is normal distribution and that the components that compose the feature vector of each frame are uncorrelated to each other, the covariance matrix $\Sigma_i$ of the silence feature distribution PDF $\{F_i(X), i=1, 2, \ldots, M\}$ becomes a diagonal matrix. The precondition for this assumption is that the covariance matrix of the silence acoustic model is also a diagonal matrix. Therefore, if the components that compose the feature vector of each frame are uncorrelated, the silence feature distribution PDF $\{F_i(X), i=1, 2, \ldots, M\}$ becomes the normal distribution $G(E_i, \Sigma_i)$ that has the mean and the variance that are corresponding to each component. Where $E_i$ is the expected value of $F_i(X)$, and $\Sigma_i$ is the covariance matrix of $F_i(X)$.

Besides, if the mean of the silence feature distribution that is corresponding to M frames of the noise observation section Tn is designated as $\mu_i$, and the variance of it is designated as $\sigma_i^2$, then the probability density function of the silence feature distribution can be designated as the normal distribution $G(\mu_i, \sigma_i^2)$, (i=1, 2, . . . , M). Therefore, the normal distribution $G(\mu_s, \sigma_s^2)$ (this is corresponding to the above-mentioned $G_s(Z)$) of the silence acoustic model that is computed in accordance with the following various method by the use of the mean $\mu_i$ and the variance $\sigma_i^2$ that are corresponding to each frame becomes the approximate distribution of the silence acoustic model $F_s(X)$ shown in FIG. 7.

The first method for calculating the normal distribution $G(\mu_s, \sigma_s^2)$ of the silence acoustic model is such a method that the mean value $\mu_s$ of the silence acoustic model is obtained from the mean of all $\mu_i$ as shown in the following equation, eq. 17, and the variance $\sigma_s^2$ of the silence acoustic model is obtained from the mean of all $\sigma_i^2$ as shown in the following equation, eq. 18, by the use of the silence feature distribution $\{G(\mu_i, \sigma_i^2), i=1, 2, \ldots, M\}$.

$$\mu_s = \frac{a}{M} \sum_{i=1}^{M} \mu_i \tag{17}$$

$$\sigma_s^2 = \frac{b}{M} \sum_{i=1}^{M} \sigma_i^2 \tag{18}$$

Where a and b are the coefficients, the optimal values of those are determined by simulations.

The second method for calculating the normal distribution $G(\mu_s, \sigma_s^2)$ of the silence acoustic model is such a method that the mean value $\mu_s$ and the variance $\sigma_s^2$ of the silence acoustic model are calculated in accordance with the following equations, eq. 19 and eq. 20, by the use of only the expected value $\mu_i$ of the silence feature distribution $\{G(\mu_i, \sigma_i^2), i=1, 2, \ldots M)\}$.

$$\mu_s = \frac{a}{M} \cdot \sum_{i=1}^{M} \mu_i \tag{19}$$

$$\sigma_s^2 = b \cdot \left( \frac{1}{M} \cdot \sum_{i=1}^{M} \mu_i^2 - \mu_s^2 \right) \tag{20}$$

Where a and b are the coefficients, the optimal values of those are determined by simulations.

The third method for calculating the normal distribution $G(\mu_s, \sigma_s^2)$ of the silence acoustic model is such a method that the mean value $\mu_s$ and the variance $\sigma_s^2$ of the silence acoustic model are calculated on the basis of the combination of the silence feature distribution $\{G(\mu_i, \sigma_i^2), i=1, 2, \ldots, M)\}$.

In this method, the probabilistic statistic of each silence feature distribution $G(\mu_i, \sigma_i^2)$ is designated as $X_i$.

$$\{X_1, X_2, \ldots, X_M\} \tag{21}$$

At this position, when the probabilistic statistic of the normal distribution $G(\mu_s, \sigma_s^2)$ of the silence acoustic model is designated as $X_s$, the probabilistic statistic $X_s$ can be represented by the linear combination of the probabilistic statistic $X_i$ and the weight function $\beta_i$, as shown in the following equation, eq. 22. In this connection, the weight function $\beta_i$ satisfies the condition of the equation 16.

$$X_s = \sum_{i=1}^{M} \beta_i \cdot X_i \tag{22}$$

And, the normal distribution $G(\mu_s, \sigma_s^2)$ of the silence acoustic model is represented as shown in the following equation, eq. 23.

$$G(\mu_s, \sigma_s^2) = G\left( \sum_{i=1}^{M} \beta_i \mu_i, \sum_{i=1}^{M} \beta_i^2 \sigma_i^2 \right) \tag{23}$$

Besides, to generalize the equation 23, the weight function $\beta_i$ is assumed to be $\{\beta_i=1/M, i=1, 2, \ldots, M\}$, and the mean value $\mu_s$ and the variance $\sigma_s^2$ are multiplied by the respective coefficient.

$$\mu_s = \frac{a}{M} \cdot \sum_{i=1}^{M} \mu_i \tag{24}$$

$$\sigma_s^2 = \frac{b}{M^2} \cdot \sum_{i=1}^{M} \sigma_i^2 \tag{25}$$

Where a and b are the coefficients, the optimal values of those are determined by simulations.

In the fourth method for calculating the normal distribution $G(\mu_s, \sigma_s^2)$ of the silence acoustic model, a statistical population $\Omega_i = \{f_{i,j}\}$ that is corresponding to the probabilistic statistic $X_i$ of the silence feature distribution $\{G(\mu_i, \sigma_i^2), i=1, 2, \ldots, M\}$ is assumed.

Wherein, if $$\{N_i=N; i=1, 2, \ldots, M\},$$

the mean value $\mu_i$ can be found by the following equation, eq. 26, and the variance $\sigma_i^2$ can be found by the following equation, eq. 28.

$$\mu_i = \frac{1}{N} \sum_{j=1}^{M} f_{i,j} \tag{26}$$

$$\sigma_i^2 = \frac{1}{N} \sum_{j=1}^{M} (f_{i,j}^2 - \mu_j)^2 \tag{27}$$

$$= \frac{1}{N} \sum_{j=1}^{M} f_{i,j}^2 - \mu_i^2 \tag{28}$$

Deformation of the equation 28 yields the following equation, eq. 29.

$$\frac{1}{N} \sum_{j=1}^{M} f_{i,j}^2 = \sigma_i^2 + \mu_i^2 \tag{29}$$

Regarding the sum of the statistical population $\Omega$, $$\Omega = \bigcup_{i=1}^{M} \Omega_i$$

we have the following equations 30 and 31 from the equation 26, and also we have the following equations 32 through 31 from the equation 29.

$$\mu_s = \frac{1}{MN} \sum_{i=1}^{M} \sum_{j=1}^{N} f_{i,j} \quad (30)$$

$$= \frac{1}{M} \sum_{i=1}^{M} \mu_i \quad (31)$$

$$\sigma_s^2 = \frac{1}{MN} \sum_{i=1}^{M} \sum_{j=1}^{N} (f_{i,j} - \mu_s)^2 \quad (32)$$

$$= \frac{1}{MN} \sum_{i=1}^{M} \sum_{j=1}^{N} f_{i,j}^2 - \mu_s^2 \quad (33)$$

$$\frac{1}{M} \sum_{i=1}^{M} (\sigma_i^2 + \mu_i^2) - \mu_s^2 \quad (34)$$

Where the equation 31 and the equation 34 are multiplied by the respective coefficients and used, in practice.

$$\mu_s = \frac{a}{M} \sum_{i=1}^{M} \mu_i \quad (35)$$

$$\sigma_s^2 = b \cdot \left( \frac{1}{M} \sum_{i=1}^{M} (\sigma_i^2 + \mu_i^2) - \mu_s^2 \right) \quad (36)$$

Where a and b are the coefficients, the optimal values of those are determined by simulations.

Besides, as shown in the following equation, eq. 27, only the variance $\sigma_s^2$ may be multiplied by the coefficient.

$$\sigma_s^2 = \frac{b}{M} \sum_{i=1}^{M} \sigma_i^2 + \frac{1}{M} \sum_{i=1}^{M} \mu_i^2 - \mu_s^2 \quad (37)$$

Next, the operation of the speech recognizing device is explained.

The voice data (the spoken voice which is the object of recognition and which is including the environment noise) that has been collected by the microphone 1 is input to the framing division 2, and, at there, the voice data is partitioned into frames. The voice data of the respective frames are sequentially supplied to the noise-observation-section extracting division 3 and the feature extracting division 5, as the observation vector a. On the noise-observation-section extracting division 3, the voice data (environment noise) of the noise observation section Tn preceding the instant $t_b$ at which the press-to-talk switch 4 has been turned to the ON position is extracted, and supplied to the feature extracting division 5 and the silence-acoustic-model correcting division 7.

On the feature extracting division 5, sound analysis of the voice data, which is the observation vector a that has been delivered from the framing division 2, is performed, so as to find its feature vector y. In addition, on the feature extracting division 5, the feature distribution parameter Z that represents the distribution in the feature vector space is calculated on the basis of the found feature vector y, and supplied to the speech recognizing division 6. On the speech recognizing division 6, the values of the discriminant functions of the acoustic models that are corresponding to the silent section and K words respectively (K is the stated number) are computed, using the feature distribution parameter that is given from the feature extracting division 5, and then the acoustic model whose function value is maximum is output as the result of the recognition of the speech. Besides, on the speech recognizing division 6, using the discriminant function that is corresponding to the silence acoustic model which is input from the silence-acoustic-model correcting division 7, the discriminant function that is corresponding to the silence acoustic model which has been being stored until that time is updated.

As stated above, the voice data that functions as the observation vector a is translated into a feature distribution parameter Z that represents the distribution in the feature vector space that is the space of the feature quantity, and so the feature distribution parameter becomes that which has regarded the distribution characteristic of the noise included in the voice data; besides, the discriminant function that corresponds to the silence acoustic model for recognizing the silent section is updated, on the basis of the voice data of the noise observation section Tn just preceding the speech; therefore, it is able to improve the correct recognition rate of speech recognition.

Figure 8:
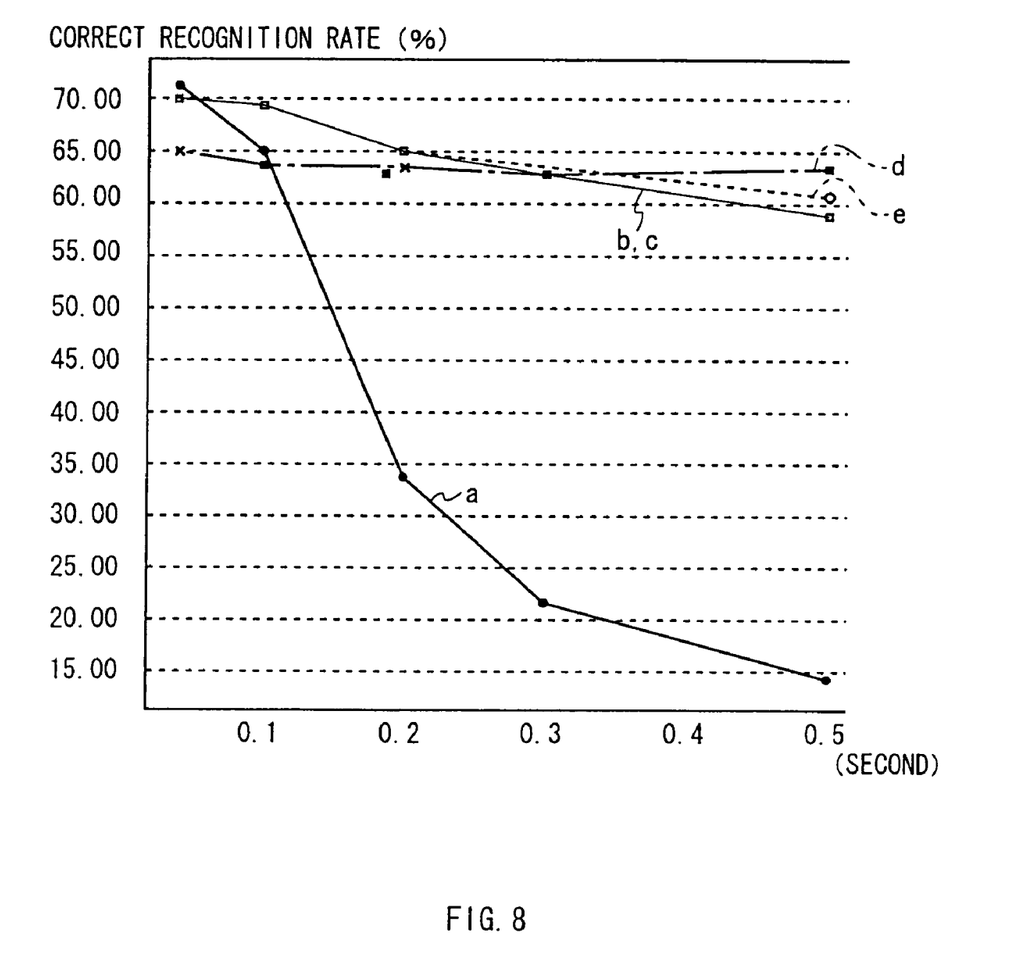
FIG. 8 is a diagram showing the experimental results of speech recognition of the speech recognition device to which the present invention has been applied.

Next, referring to FIG. 8, it is illustrating the results of the experiment of measuring the variation of the correct speech recognition rate at the time when the silent section Ts, which is the interval from turning On of the press-to-talk switch until starting of the speech, is varied.

In FIG. 8, the curve denoted "a" shows the result based on the conventional method wherein the silence acoustic model is not corrected, the curve denoted "b" shows the result based on the first method, the curve denoted "c" shows the result based on the second method, the curve denoted "d" shows the result based on the third method, and the curve denoted "e" shows the result based on the fourth method.

The conditions of the experiment are as shown below. The voice data that are to be recognized have been collected at the inside of a car that have been being run on a highway. The noise observation section Tn is about 0.2 second that corresponds to 20 frames. The silent section Ts has been set to 0.05 second, 0.1 second, 0.2 second, 0.3 second, and 0.5 second. In feature extraction of the voice data, analysis has been performed with MFCC (Mel-Frequency Cepstral Coefficients) domain. The speakers of the voice that is the object of recognition have been 8 persons, 4 men and 4 women, and 303 words per person have been spoken in a discrete manner. The task is 5000 words, in large vocabulary discrete Japanese. The acoustic models are based on HMM, and are that which have been previously learned by the use of the satisfactory voice data. In the speech recognition, the beam width has been set to 3000 in Viterbi search method.

In the cases of the first, the second, and the fourth methods, the coefficient a has been set to 1.0, and the coefficient b has been set to 0.1. In the case of the third method, the coefficient a has been set to 1.0, and the coefficient b has been set to 1.0, too.

As will be seen from FIG. 8, according to the conventional method (the curve a), the correct speech-recognition rate remarkably lowers as the silent section Ts becomes longer, however, according to the first method through the fourth method of the present invention (the curve b through the curve e), the correct speech-recognition rate shows only a little lowering even though the silent section Ts becomes longer. That is, according to the present invention, even if the silent section Ts varies, it is able to maintain the correct speech-recognition rate to a certain level.

A speech recognizing device to which the present invention has been applied has been hereinbefore explained; the speech recognizing device like this can be applied to the wide variety of devices, such as a voice-entry car navigation device.

In this embodiment, the feature distribution parameter has been found wherein the distribution characteristic of the noise has been regarded; this noise may include the others, such as the characteristics of the communication channel of the case where the speech recognition is performed with respect to the voice that is transmitted via a communication channel, for instance, a telephone line, as well as the external noise under the environment at which the speech is performed.

Besides, the present invention is applicable to the case of performing pattern recognition such as picture recognition, as well as speech recognition.

The computer program for executing said each processing can be supplied to a user, via a network providing medium such as the Internet and a digital satellite, as well as a providing medium that is comprised of an information recording medium such as a magnetic disk and a CD-ROM.

INDUSTRIAL APPLICABILITY

The present invention is applicable to a speech recognizing device.

The invention claimed is:

1. A pattern recognizing device for classifying a feature distribution of input data into any of a stated number of models, comprising:
    activation means for indicating a beginning of speech;
    extracting means for extracting a pattern of said input data as the feature distribution;
    storing means for storing said stated number of models;
    classifying means for classifying the feature distribution that has been extracted by said extracting means into any of said stated number of models; and
    generating means for generating said model that corresponds to such a state that said data do not exist, on the basis of the noise that has been input at the time just preceding the inputting of said data, and for updating that which is corresponding to it and is stored in said storing means
        wherein the generating means measures a variation of correct speech recognition rate during a time period between activation of the activation means and the beginning of speech.

2. The pattern recognizing device of claim 1, wherein in the case where the feature distribution of such a state that said data do not exist, and the probability distribution of said model that corresponds to such a state that said data do not exist are normal distribution, said generating means generate the expected value of said model that corresponds to such a state that said data do not exist, as the mean of the expected values that correspond to the respective components of the feature distribution of such a state that said data do not exist, and generate the variance of said model that corresponds to such a state that said data do not exist, as the mean of the variances that correspond to the respective components of the feature distribution of such a state that said data do not exist.

3. The pattern recognizing device of claim 1, wherein in the case where the feature distribution of such a state that said data do not exist, and the probability distribution of said model that corresponds to such a state that said data do not exist are normal distribution, said generating means generate the expected value and the variance of said model that corresponds to such a state that said data do not exist, by the use of the mean of the expected values that correspond to the respective components of the feature distribution of such a state that said data do not exist.

4. The pattern recognizing device of claim 1, wherein in the case where the feature distribution of such a state that said data do not exist, and the probability distribution of said model that corresponds to such a state that said data do not exist are normal distribution, said generating means generate the probability distribution of said model that corresponds to such a state that said data do not exist, on the basis of the linear combination of the statistics that correspond to the respective components of the feature distribution of such a state that said data do not exist.

5. The pattern recognizing device of claim 1, wherein in the case where the feature distribution of such a state that said data do not exist, and the probability distribution of said model that corresponds to such a state that said data do not exist are normal distribution, said generating means generate the probability distribution of said model that corresponds to such a state that said data do not exist, on the basis of the sum of the statistical populations that correspond to the respective components of the feature distribution of such a state that said data do not exist.

6. A pattern recognizing method of a pattern recognizing device for classifying a feature distribution of input data into any of a stated number of models, said method comprises:
    an activation step for indicating a beginning of speech;
    an extracting step of extracting the pattern of said input data as the feature distribution;
    a storing step of storing said stated number of models;
    a classifying step of classifying the feature distribution that has been extracted on said extracted step into any of said storing number of models;
    a generating step of generating said model that corresponds to such a state that said data do not exist, on the basis of the noise that has been input at the time just preceding the inputting of said data, and then updating the corresponding one that has been stored on said storing step; and
    measuring a variation of correct speech recognition rate during a time period between activation of a switch and the beginning of speech.

7. A providing medium for providing a program to a pattern recognizing device for classifying a feature distribution of input data into any of a stated number of models, said program can be read by a computer which causes the pattern recognizing device to execute the processing that comprises:
    an activation step for indicating a beginning of speech;
    an extracting step of extracting the pattern of said input data as the feature distribution;
    a storing step of storing said stated number of models;
    a classifying step of classifying the feature distribution that has been extracted on said extracting step into any of said stated number of models;
    a generating step of generating said model that corresponds to such a state that said data do not exist, on the basis of the noise that has been input at the time just preceding the inputting of said data, and then updating the corresponding one that has been stored on said storing step; and measuring a variation of correct speech recognition rate during a time period between activation of a switch and the beginning of speech.

8. A pattern recognition device comprising:

a transmission means;

an activation means for indicating a beginning of speech;

an extraction means for extracting one or more data patterns from a first transmission signal including at least one data pattern of noise and one data pattern of speech;

a storage means for storing a number of data pattern models including at least one of noise and one of speech;

a classifying means for classifying the extracted data pattern as one of the stored data models, an updating means for updating the stored data pattern models, with extracted data patterns; and a generating means for generating a second transmission signal having the noise removed, wherein, said extraction means extracts a noise data pattern in a transmission immediately following switching on the transmission means, but prior to the occurrence of a speech data pattern portion of the transmission, wherein said extracted noise data pattern and said speech data pattern are utilized to distinguish portions of said first transmission signal and cancel the noise in said first transmission signal to produce said second transmission signal, and wherein the generating means measures a variation of correct speech recognition rate during a time period between activation of the activation means and the beginning of speech.

* * * * *